(12) United States Patent
Neuhoff

(10) Patent No.: US 11,148,641 B2
(45) Date of Patent: Oct. 19, 2021

(54) METHOD FOR ACTIVATING AT LEAST ONE FUNCTION OF A VEHICLE

(71) Applicant: HUF HUELSBECK & FUERST GMBH & CO KG, Velbert (DE)

(72) Inventor: Stefan Neuhoff, Essen (DE)

(73) Assignee: HUF HUELSBECK & FUERST GMBH & CO KG, Velbert (DE)

( * ) Notice: Subject to any disclaimer, the term of this patent is extended or adjusted under 35 U.S.C. 154(b) by 0 days.

(21) Appl. No.: 16/334,890

(22) PCT Filed: Sep. 20, 2017

(86) PCT No.: PCT/EP2017/073726
§ 371 (c)(1),
(2) Date: Mar. 20, 2019

(87) PCT Pub. No.: WO2018/054943
PCT Pub. Date: Mar. 29, 2018

(65) Prior Publication Data
US 2019/0299929 A1    Oct. 3, 2019

(30) Foreign Application Priority Data
Sep. 20, 2016    (DE) ............ 10 2016 117 654.0

(51) Int. Cl.
*B60R 25/24* (2013.01)
*G07C 9/00* (2020.01)

(52) U.S. Cl.
CPC .......... *B60R 25/24* (2013.01); *G07C 9/00309* (2013.01); *B60R 2325/205* (2013.01); *G07C 2209/63* (2013.01)

(58) Field of Classification Search
CPC .............. B60R 25/24; B60R 2325/205; G07C 9/00309; G07C 2209/63
See application file for complete search history.

(56) References Cited

U.S. PATENT DOCUMENTS

| | | | |
|---|---|---|---|
| 2006/0114100 A1* | 6/2006 | Ghabra | E05B 81/78 340/5.61 |
| 2010/0075655 A1 | 3/2010 | Howarter | |
| 2013/0217418 A1* | 8/2013 | Maurin | H04W 4/029 455/456.3 |
| 2015/0118985 A1* | 4/2015 | Lawrence | H04B 17/27 455/226.2 |
| 2015/0222708 A1* | 8/2015 | Addepalli | H04W 72/0406 709/217 |

(Continued)

FOREIGN PATENT DOCUMENTS

| DE | 102014107186 | 11/2015 |
|---|---|---|
| WO | WO 2009/030563 | 3/2009 |

*Primary Examiner* — Fekadeselassie Girma
(74) *Attorney, Agent, or Firm* — Jacobson Holman PLLC

(57) ABSTRACT

Method for activating at least one function of a vehicle, a mobile communication device being provided for communication, characterized by the following steps: monitoring the communication, wherein at least one evaluation signal specific for the communication is determined, detecting a vehicle influence on a transmission during communication using an evaluation of the evaluation signal in order to perform a localization of the communication device and activating the function of the vehicle depending on the detection of the vehicle influence.

18 Claims, 2 Drawing Sheets

(56) References Cited

U.S. PATENT DOCUMENTS

| | | | |
|---|---|---|---|
| 2016/0042579 A1* | 2/2016 | Austen | B60R 25/24 340/5.61 |
| 2016/0165548 A1* | 6/2016 | Mohlmann | H04B 7/15535 455/522 |
| 2016/0335895 A1* | 11/2016 | Lui | G08G 1/205 |
| 2017/0332458 A1* | 11/2017 | Salter | B60Q 1/04 |
| 2018/0084371 A1* | 3/2018 | Scagnol | G01S 5/0205 |
| 2019/0156603 A1* | 5/2019 | Breer | |
| 2019/0299929 A1* | 10/2019 | Neuhoff | B60R 25/24 |
| 2020/0023812 A1* | 1/2020 | Hassani | H04W 4/44 |

\* cited by examiner

METHOD FOR ACTIVATING AT LEAST ONE FUNCTION OF A VEHICLE

BACKGROUND OF THE INVENTION

This invention relates to a method for activating at least one function of a vehicle.

It is known from the state of the art that so-called identification encoders (ID encoders) are used as electronic keys for the authentication of a vehicle. For example, there is wireless communication between the ID transponder and the vehicle in order to transmit a code, which is then verified by the vehicle and, if there is a match, access to the vehicle is permitted. Usually, the authentication is initiated by manual operation of the ID transponder by the vehicle operator.

Increasingly, however, keyless go systems are also being used which do not require such manual operation. Here the approach of the operator with the ID transponder to the vehicle is recognized and the authentication is initiated with a sufficient approach. For example, approaching or touching the door handle initiates the authentication process so that access to the vehicle is possible after successful authentication (e.g. by opening a door lock). It may then be possible for such authentication to also take place to start the engine. For this it is necessary that the ID transponder is located inside the vehicle, so that the engine start or the operation of the vehicle is prevented after the operator gets out of the vehicle with the ID transponder.

One problem here is that the detection of the interior/exterior space, i.e. the location of the ID transmitter inside or outside the vehicle, is very difficult and technically complex to carry out. In particular, the indoor/outdoor recognition of conventional authentication systems or authentication procedures is technically very complex in order to ensure comfortable and/or secure operation of the vehicle at all times and/or sufficiently.

SUMMARY OF THE INVENTION

It is therefore an object of the present invention to at least partially eliminate the disadvantages described above. In particular, one task of the present invention is to enable secure and reliable authentication. In particular, an improved interior/exterior detection shall be proposed, which is preferably cheaper and/or technically easier to implement.

The preceding object is solved by a method and by a system. Further characteristics and details of the invention result from the respective dependent claims, the description and the drawings. Features and details which are described in connection with the method in accordance with the invention naturally also apply in connection with the system in accordance with the invention, and vice versa in each case, so that with regard to the disclosure of the individual aspects of the invention, reference is or can always be made to each other.

In particular, the object is solved by a method, preferably an authentication method, for activating at least one function of a vehicle, preferably a security system of a vehicle. The vehicle is, for example, a motor vehicle and/or an electric vehicle and/or a passenger vehicle and/or a heavy goods vehicle and/or a hybrid vehicle. The security system is in particular an access system and/or a keyless go system and/or a vehicle authentication system. Preferably, the security system includes at least one of the following functions and/or the inventive method serves to activate at least one of the following functions:

release of a motor start,
enabling the activation of a power supply of electronic components of the vehicle,
unlocking of the vehicle, in particular a central locking of the vehicle,
release and/or opening of a door lock, in particular an electric or electronic lock, of the vehicle,
enabling and/or activating comfort functions of the vehicle, e.g. headlight beam of the vehicle,
retrieve and/or activate presets, in particular user specific presets such as a maximum speed, which parameterized the operation of the vehicle.

Preference is given to a mobile communication device, in particular a mobile telephone and/or a smartphone and/or a tablet and/or a computer and/or an ID transponder, which serves for (at least) one communication (i.e., for example, for a first and/or for a second communication and/or for mobile radio communication).

Preferably at least one of the following steps is carried out, whereby the steps are carried out in particular one after the other or in any order, and/or individual steps can also be carried out repeatedly:

a) monitoring of the communication (i.e. in particular at least one of the communications), in particular a mobile radio communication and/or a GPS communication and/or a first communication and/or a communication for data transmission, at least one evaluation signal specific to the communication being determined, b) detecting a vehicle influence on a transmission, in particular on a signal transmission and/or on a signal path, during communication using an evaluation of the evaluation signal in order to perform a localization (in particular interior/exterior space detection) of the communication device, preferably with respect to a vehicle interior of the vehicle. In particular, the vehicle influence is specific to a location of the communication device with respect to the vehicle interior and/or with respect to individual areas in the vehicle interior, c) Activating the function of the vehicle depending on the detection of the vehicle influence.

In other words, the detection of the vehicle influence can be used to determine where the communication device is (inside or outside the vehicle) and, depending on this, to activate the function of the vehicle. For example, it is conceivable that a first function can be activated in a first dependence on the detection of the vehicle influence, and a second function can be activated in a second dependence on the detection of the vehicle influence. As a first function, for example, access to the vehicle, in particular unlocking and/or opening a lock of the vehicle, can be activated if the detection of the vehicle influence is omitted (i.e. the vehicle influence is not detected positively). Preferably the motor start is locked (not enabled) according to the first function. As a second function, e.g. an engine start can be enabled/permitted if the vehicle influence (positive) is detected. In the first case, the failure to detect the vehicle influence may in particular indicate that the communication device is outside the vehicle. In the second case, the detection of the vehicle influence, i.e. the presence of the vehicle influence on the transmission, can be used to conclude that the communication device is inside the vehicle. Alternatively or additionally, for example, a value or flag is set as the first function to indicate that the communication device is outside the vehicle if the communication device is located outside the vehicle. As a second function, for example, the value or flag is changed to indicate that the communication device is inside the vehicle when the communication device is located inside the vehicle. This has the advantage that the communication device can be easily and reliably localized (localization, in particular indoor/outdoor detection).

In particular, the advantage of the method according to the invention is that an already existing communication, in particular a communication link (e.g. between the communication device and/or the vehicle or between the communication device in a communication network, e.g. a mobile radio network) is used to perform an interior/exterior detection. Interior/exterior space detection means in particular that a distinction can be made between whether the communication device is located inside the vehicle or outside the vehicle (vehicle exterior space). Of course, it is also conceivable that further localization is possible through the inventive procedure, so that, for example, a distinction can also be made if the communication device is located in different areas of the vehicle interior and/or different areas of the vehicle exterior. The different/distinguishable areas are, for example, different vehicle sides, and/or front and rear seats, and/or driver and passenger seats, and/or left and right sides of the vehicle, and/or vehicle front and rear. The localization can then be supported by sensors in the respective areas, for example.

In particular, the vehicle influence on the transmission shall be understood to mean that the influence of the vehicle influence is the physical influence of the transmission of an existing communication, and thus occurs in particular without active participation in the communication, e.g. through an exchange of data in the communication. Preferred is the evaluation according to step b) not the evaluation of the contents of the communication, e.g. the communication data, but a signal evaluation, i.e. in particular the characteristics of the signal, e.g. the signal strength and/or a pattern in a frequency spectrum of the signal. The vehicle influence, in particular the physical influence of the transmission, means in particular the influence of the transmission path and/or the signal and/or wave propagation and/or the amplitude (and/or frequency) of the radio signals or electromagnetic waves of the communication.

It is also conceivable that the evaluation signal is a signal containing information about the signal strength and/or frequency spectrum of a communication signal of the communication. Alternatively or additionally it is conceivable that the evaluation signal is a time series signal and/or has a sequence of data which can be evaluated to detect the vehicle influence, e.g. with information about a signal strength and/or a frequency spectrum and/or a modulation of a communication signal of the communication, and/or the like.

It is conceivable that it is provided for evaluation of the evaluation signal (in accordance with step b)) and/or for detection in accordance with step b) that an (e.g. statistical) analysis and/or filtering and/or transformation and/or time series analysis and/or pattern recognition and/or the like takes place in the evaluation signal. In particular, a software (e.g. of the communication device, in particular a smartphone app) is started and/or parameterized for initiating and/or carrying out the evaluation, so that the evaluation is carried out by the software, e.g. by an algorithm. The software is started, for example, by initiating and/or triggering the monitoring according to step a) and/or the detection according to step b). In particular, a data link between the vehicle and the communication device is used for transmitting and/or starting and/or parameterizing, e.g. to transmit a file and/or a start command and/or parameter values from the vehicle to the communication device. The data connection is, for example, a second or third communication (in particular the possible communications of the communication device), preferably a Bluetooth (e.g. Bluetooth Low Energy) communication.

Furthermore, communication within the scope of the invention is understood in particular to mean wireless communication, e.g. mobile radio communication and/or Bluetooth communication, in particular Bluetooth low energy communication and/or NFC (near field communication) communication and/or the like. Preferably, communication (in a broader sense) also means the reception of a GPS (global positioning system). In particular, communication takes place as a bidirectional or unidirectional communication between the communication device and at least one other communication subscriber, e.g. the vehicle and/or a base station of a mobile radio network or the like. This enables a versatile use of the inventive system.

It is conceivable that the communication device for communication can, for example, only carry out and/or support one communication or also several communications (i.e. in particular communication possibilities) of the same or different communication type. In addition to communication as a first communication, a second communication (e.g. vehicle communication) with the vehicle can also be provided. It may also be possible that further initial communications are planned, e.g. as communication possibilities of different types of communication and/or different frequencies, e.g. different mobile radio frequencies.

Preferably, the activation (e.g. of the first and/or second function) according to step c) is only performed if the communication device is located in the interior of the vehicle and/or if a sufficiently strong vehicle influence is detected so that the communication device can be reliably located in the interior. The interior is, for example, the passenger area of the vehicle. Localization, in particular localization or position determination, is carried out to distinguish at least two locations of the communication device, e.g. inside and outside the vehicle. According to the invention, it will be of particular use that localization is possible by detecting the vehicle influence. This is caused in particular by the fact that the vehicle influence on the communication is location-dependent in relation to the communication device.

For example, the vehicle influence is a (especially also purely/exclusively) passive influence, preferably a vehicle influence body of the vehicle on the transmission, and/or an (especially also purely/exclusively) active influence, e.g. an actively transmitted signal and/or actively transmitted radio waves. Preferably, the vehicle influence is such an influence, which impairs and/or modifies the transmission during communication. In particular, the vehicle influence influences at least one transmission condition, i.e. the vehicle influence forms a (physical) influence on a communication signal, e.g. radio signal, the communication. For example, communication is dependent on transmission conditions, such as the physical influence of the environment and the transmission medium on communication, e.g. absorption or attenuation of the communication signal or impairment of the signal path. The vehicle influence determines and/or influences the transmission conditions in such a way that the vehicle influence causes a change, absorption and/or attenuation of the communication signal. The communication signal is, for example, a mobile radio signal and/or a GPS signal and/or an NFC signal and/or a WLAN (wireless local area network) signal and/or an HF (high frequency) signal and/or an LF (low frequency) signal and/or a UWB (ultra wideband)

signal. The communication is thus, for example, a reciprocal or only a one-sided transmission of information, e.g. also via GPS.

It is also conceivable that, in addition to the evaluation of the evaluation signal, an additional evaluation can also be carried out for localization. The additional evaluation comprises, for example, the evaluation of a GPS signal and/or the evaluation of a cell ID (mobile phone cell identification) and/or the evaluation of a signal strength of a further communication signal with which the vehicle communicates with the communication device, e.g. Bluetooth, and/or the evaluation of at least one sensor of the vehicle. For example, at least one proximity sensor of the vehicle and/or at least one (e.g. switching) sensor of the vehicle, for example a (driver) seat sensor and/or a door contact sensor of a door handle, and/or an accelerator (gas pedal) sensor and/or a brake pedal sensor and/or at least one camera sensor of the vehicle and/or the like can be provided as the sensor. Furthermore, in particular a sensor of a belt tensioner and/or a sensor on or in a vehicle seat for detecting a weight load and/or a sleep sensor (fatigue sensor), in particular in the region of an instrument panel of the vehicle, and/or an optical sensor and/or an acoustic sensor and/or the like can also be used in order to carry out and/or support the localization in addition to the evaluation of the evaluation signal.

Optionally, it may be possible for the monitoring according to step a) and/or the detection and/or evaluation of the evaluation signal according to step b) to be triggered, in particular by receiving a trigger signal, in particular a sensor or the like of the vehicle. In particular, the trigger signal can be generated by the vehicle and transmitted to the communication device in such a way that it is received by the communication device. For example, the triggering and/or the generation of the trigger signal takes place if at least one of the following events, in particular trigger events, occurs:
 Actuation and/or triggering of a proximity sensor or the like of the vehicle,
 Actuation and/or triggering of a (specific, e.g. driver's seat) seat sensor and/or door contact of the vehicle,
 Actuation and/or release of a brake pedal and/or accelerator pedal on the vehicle,
 Actuation of a motor start actuator, in particular a motor start button.

Preferably, the evaluation signal is evaluated by the vehicle and/or by the communication device, whereby in particular a temporal course of the evaluation signal is stored and/or temporarily stored for this purpose. For this purpose, the communication device and/or the vehicle comprises at least one data storage unit or a data memory, in particular a ring buffer, preferably for the persistent or volatile storage of the course of the evaluation signal. The evaluation signal is preferably stored or buffered in such a way that a temporal course of the evaluation signal is available (in particular is available for evaluation). Preferably, the evaluation signal is recorded over a certain period of time and/or recorded in accordance with a ring memory technology in such a way that the evaluation signal is continuously stored over a certain period of time and is overwritten again after a specified time has elapsed. This has the advantage that at any time a certain period of time, in particular a contiguous period of time, of the course of the evaluation signal is available for evaluation and/or localization. In particular, it is conceivable that the evaluation signal or the course of the evaluation signal is recorded as a time series and/or is evaluated in time series so that, in particular, a past course of the evaluation signal can also be taken into account. In particular, it is conceivable that the communication device will always temporarily store a certain period of the evaluation signal, in particular regardless of whether the communication is monitored by the vehicle. For example, the monitoring according to step a) can only be initiated when a certain triggering event has occurred and/or is detected, e.g. when a sensor of a vehicle seat detects the seat load and/or when an approach to an engine start actuator or activation of an engine start actuator, in particular start/stop switch and/or start/stop button, occurs. Since at this point in time the vehicle influence is, for example, in the past, it is advantageous if a temporal course of the evaluation signal can already be accessed at this point in time for the evaluation according to step b). For this purpose, the evaluation signal can, for example, be temporarily stored by the vehicle and/or by the communication device, e.g. independently of the initiation of the monitoring according to step a) and/or always, for a certain period of time.

Optionally, it may be possible that, in addition to a passive influence (in particular the vehicle influence as a passive vehicle influence), e.g. a vehicle body or the like, the vehicle influence (and/or another vehicle influence), e.g. an active vehicle influence, e.g. by an interfering signal, is provided. The active vehicle influence can be achieved, for example, by emitting a radio signal which, like the passive vehicle influence, impairs and/or changes the transmission during communication. This can further improve the reliability of the localization.

It can also be advantageously provided that the evaluation signal, in particular as raw mobile communication data, and/or a result of the evaluation is transmitted from the mobile communication device to the vehicle via further communication (vehicle communication). Further communication is, for example, Bluetooth communication, in particular Bluetooth low energy communication, and/or NFC communication and/or mobile radio communication and/or the like. In particular, the type of communication and/or the communication participants of the further communication differs from the communication monitored according to step a).

Preferably, the monitored according to step a) is a mobile radiocommunication, especially in a mobile radio network, e.g. GSM (global system for mobile communications) and/or UMTS (universal mobile telecommunications system) and/or LTE (long term evolution). In particular, communication is a type of communication in which the transmission can be changed and/or impaired by the vehicle influence.

A further advantage may be that the communication is carried out by the mobile communication device as a mobile radio communication via a mobile radio network, and preferably a vehicle communication (as a further communication) is carried out with the vehicle, which communication is carried out in particular via a communication technology different from mobile radio, preferably via Bluetooth and/or NFC and/or WLAN and/or HF and/or LF and/or UWB and/or GPS, and wherein preferably each of the communication subscribers differs from the vehicle in the communication. It is conceivable that the communication monitored according to step a) and/or a further communication between the communication device and the vehicle or between the communication device and a communication participant different from the vehicle is carried out. The communication monitored according to step a) may preferably differ from the other communication, in particular with regard to the communication technology used (e.g. WLAN or Bluetooth) and/or with regard to the communication participants. In other words, the communication of the communication device, in particular the communication which is monitored and used for localization, does not necessarily have to be carried out with the vehicle. This has the advantage that the inventive process can be used in many different ways.

Furthermore, it is conceivable that the mobile communication device the communication carries out the communication as a vehicle communication with the vehicle, preferably via Bluetooth and/or NFC and/or mobile radio and/or WLAN and/or HF and/or LF and/or UWB and/or GPS, wherein further communication via a further communication technology is preferably carried out by the mobile communication device. The other communication technology is e.g. Bluetooth (especially Bluetooth Low Energy) and/or NFC and/or mobile radio and/or WLAN and/or HF and/or LF and/or UWB and/or GPS. This has the advantage that, for example, the evaluation signal and/or a result of the evaluation can be transmitted via the monitored communication and/or via further communication.

It may be provided that the evaluation signal, in particular as raw mobile radio data, and/or a course of the evaluation signal and/or a result of the evaluation in accordance with step b) and/or a partial result of the evaluation from the communication device via the communication, in particular the communication monitored in accordance with step a) and/or a further communication, is transmitted to the vehicle. This has the advantage that the communication device can, for example, record and/or store the evaluation signal independently of the vehicle in order to make it available to the vehicle in good time for localization.

In accordance with an advantageous further embodiment of the invention, it may be provided that, in addition to the communication as primary communication in accordance with step a), in a further communication, in particular a vehicle communication, the monitoring is carried out so that the evaluation signal for the further communication is specific if the monitoring of the primary communication in accordance with step a) is unsuccessful, in particular if the signal strength is too low, in particular a communication signal, for the primary communication. It may also be provided that the vehicle communication is not only monitored as an alternative to the primary communication, but at the same time in order to carry out the localization on the basis of both communication and thus to improve it. This has the advantage that the reliability of the localization can be increased, in particular if the evaluation is made more difficult, e.g. due to a lack of signal strength, in particular of a communication signal during primary communication.

Furthermore, it is optionally possible within the scope of the invention for the communication device to be located by a positioning system, in particular GPS or the like, in particular to improve the accuracy of the localization in accordance with step b). In particular, this (GPS) localization supports the localization by comparing the result of the (GPS) localization with the result of the localization according to step b). This has the advantage that the accuracy of the localization can be increased.

The localization can include, for example, the following steps, which can be performed one after the other or in any order:
  determining a first location information, in particular using a GPS signal, the first location information being specific for a location of the vehicle,
  determining a second location information, in particular using the or a further GPS signal, the second location information being specific for a location of the communication device,
  comparing the first location information with the second location information so that preferably the match and/or the difference and/or the distance between the location of the vehicle and the location of the communication device is determined.

In particular, it may be provided that the function of the vehicle according to step c) is only activated if the location of the vehicle matches the location of the communication device. In addition, it may be possible for the function or another function to be activated even if the distance exceeds or falls below a minimum distance.

Advantageously, the invention may provide that the detection of the vehicle influence in accordance with step b) is used to determine if the communication device is located in the vehicle-interior and/or is moved there. Preferably, the activation of the function of the vehicle in accordance with step c) if (in particular only if) the detection of the vehicle influence in accordance with step b) determines that the communication device is located in the interior of the vehicle and/or is moved there. Preferably the localization in accordance with step b) is carried out in such a way that a location of the communication device in the vehicle interior is distinguished from at least one further location of the communication device outside the vehicle. It is also conceivable that different areas in the vehicle interior can be distinguished by localization. For this purpose, the evaluation is carried out according to step b), e.g. in such a way that the different vehicle influences can be evaluated and/or differentiated for different areas in the vehicle interior due to the different geometry of the vehicle body. For example, release engine start as a first function (or as a second function) will only be activated if the communication device is located in the driver's seat area. This can also increase the safety during operation of the vehicle.

It may also be possible for the detection of the vehicle influence in accordance with step b) to determine if the communication device is located and/or (in particular from the interior of the vehicle) moved to the outside of the vehicle. The activation of the function or a further function of the vehicle is preferred (in particular only) in accordance with step c) if it is established on the basis of the detection of the vehicle influence in accordance with step b) that the communication device is located outside the vehicle and/or is moved there (from the vehicle interior). Preferably, the localization in accordance with step b) is carried out in such a way that a location of the communication device in the vehicle exterior space is distinguished from at least one further location of the communication device within the vehicle. Preferred is the further function a locking of the vehicle and/or the activation of an anti-theft device or the like. In addition or alternatively, the further function can (at the latest) be activated if a communication signal and/or a connection signal between the vehicle and the communication device is interrupted and/or attenuated below a predefined threshold.

Furthermore, it is conceivable that according to step b) a first vehicle influence is detected which is specific for a location within the vehicle or an introduction of the communication device into a vehicle interior, and preferably a second vehicle influence is detected which is specific to a location outside the vehicle or an introduction of the communication device into a vehicle exterior (or outside the vehicle interior). Preferably, a first function is activated depending on the detection of the first vehicle influence (e.g. an engine start release) and preferably a second function is activated depending on the detection of the second vehicle influence (e.g. a locking of the vehicle doors). Thus, the removal from the vehicle can also be reliably detected.

It may preferably be provided that, when the evaluation signal is evaluated in accordance with step b), an extent of the vehicle influence on the communication, in particular mobile radio communication, in particular the transmission in the (mobile radio) communication, is determined, and the localization of the communication device in accordance with step b) is carried out by locating the communication device in the vehicle interior, if the extent and/or the evaluation signal is specific for locating in the vehicle interior, preferably if the extent exceeds a limit and/or the evaluation signal has a specific pattern. The pattern can be, for example, a frequency pattern and/or a temporal pattern in the course of the evaluation signal. For example, a statistical analysis and/or a time series analysis of the evaluation signal is performed during the evaluation according to step b).

Optionally, it is conceivable that the monitoring of communication, in particular mobile radio communication, is triggered by the vehicle, preferably when at least one sensor of the vehicle is actuated and/or when a trigger signal is received and/or when a trigger event occurs. The sensor can, for example, be located in the vehicle interior, preferably in or on a driver's seat of the vehicle. The sensor can also be designed as an engine start actuating device, in particular a start/stop button, for the vehicle. It is also conceivable that the sensor is arranged as a proximity sensor, e.g. in the area of the motor start actuator. It is also conceivable that the sensor is a door sensor, so that, for example, the triggering takes place during or after the closing of some or all doors of the vehicle. In particular, the passive influence or vehicle influence is only present when all doors of the vehicle are closed. It may be possible that the vehicle influence and/or the activation of the function only takes place if the sensor has been positively actuated and/or authenticated with the communication device beforehand. The actuation is to be understood in particular as a positive detection and/or recognition of an activation action and/or the like, whereby the sensor can, for example, be designed as a capacitive sensor and/or as a switch or the like. This has the advantage that the monitoring does not have to take place permanently and thus energy consumption can be reduced.

Monitoring" means, in particular, the determination of the evaluation signal and, alternatively or additionally, the acquisition and/or evaluation and/or (intermediate) storage of a communication signal, in particular of data transmitted by the communication and/or of a signal strength.

A further advantage may be that the detected vehicle influence is specific for an interference influence on the communication, in particular mobile communication, caused by the bodywork of the vehicle and only has a significant effect on the communication of the communication device, in particular mobile communication, if the communication device is located in the interior of the vehicle. In particular, it may be envisaged that the vehicle influence and/or the blocking influence will only have a significant effect on communication, i.e. can only be detected if all doors of the vehicle are closed. This ensures that the vehicle is ready for operation when the function is activated due to the detection.

In addition, it can be advantageous in the context of the invention that a signal jump of the evaluation signal is detected during the evaluation according to step b) to detect the vehicle influence, particularly in the case of a signal strength curve. In particular, the evaluation signal corresponds to the signal strength curve or the signal strength curve can be determined from the evaluation signal. The signal jump is characterized, for example, by an above-average (e.g. negative) gradient of the evaluation signal (or signal strength gradient) being determined. Thus, the vehicle influence can be reliably distinguished from other influences on communication. In particular, it is conceivable that the signal jump, e.g. as a pattern, is compared with a specification, and/or the vehicle influence is only detected (positively) if the characteristics of the signal jump (such as duration and extent) satisfy the specification. For this purpose, the template is stored in a data memory or a data storage unit, such as a flash memory. In particular, the template is determined by the communication, in particular a communication type (communication technology), by the communication device and/or by the vehicle, since different signal jumps may occur with different communication types or different hardware of the communication device. In particular, it is conceivable that the specification is specified and/or generated by the communication device, in particular by software of the communication device, and is transmitted to the vehicle, for example, by further communication (vehicle communication).

In another possibility, it may be provided that the evaluation signal is determined as a function of a mobile radio signal of the mobile radio communication, in particular (e.g. exclusively) as a function of the signal strength of the mobile radio signal, the mobile radio signal preferably being designed as a GSM or UMTS or LTE signal. So that the evaluation signal and/or the mobile radio signal can be evaluated by the vehicle, it may be provided that the evaluation signal and/or the mobile radio signal and/or a result of the evaluation is transmitted from the communication device to the vehicle, e.g. via a further communication which differs in particular from the communication monitored in accordance with step a). This has the advantage that the vehicle can use the mobile communication of the communication device as an existing communication to carry out a localization. Another advantage is that the mobile device can replace a separate ID transponder in order to carry out authentication in a secure and convenient manner. For this purpose, for example, authentication, in particular the transmission of a code, is carried out through further communication. Preferred is the (first) communication a communication, which can be influenced by the vehicle exclusively due to the vehicle influence, in particular by the vehicle body. In particular, the (first) communication and/or the monitored communication and/or the primary communication is such a communication which cannot be influenced by the vehicle in terms of content.

It may optionally be possible to evaluate a temporal course of the evaluation signal in accordance with step b), whereby the evaluation in particular is carried out by a time series analysis. In particular, it is conceivable that a statistical analysis of the evaluation signal takes place during the evaluation, in particular a time course of the evaluation signal being evaluated for this purpose, the evaluation signal and/or a communication signal, in particular a mobile radio signal, of the communication preferably being recorded over a period of at least 100 ms or at least 500 ms or at least 1 s or at least 10 s or at least 100 s in order to determine the course. This can significantly increase the reliability of the evaluation.

It is also conceivable within the scope of the invention that, in accordance with step b), a signal jump and/or pattern is detected in a time profile of the evaluation signal which is specific for introducing the communication device from the outside of the vehicle into the interior of the vehicle (and/or closing all the doors of the vehicle), the signal jump preferably being evaluated as a statistical pattern in the evaluation signal, preferably in an amplitude and/or phase and/or frequency course of the evaluation signal. Accordingly, it may be possible for the evaluation signal to include amplitude and/or phase and/or frequency information. In particular, pattern recognition can be performed for evaluation in accordance with step b). It is conceivable that the evaluation may be carried out at least in part by vehicle electronics, in particular central vehicle electronics and/or a processing unit of the vehicle. This ensures a sufficiently fast processing for evaluation. In particular, the processing unit and/or an evaluation unit of the communication device and/or the electronics of the vehicle comprises electronic components, in particular a microprocessor and/or a digital signal processor and/or a flash memory and/or an integrated circuit, preferably an application-specific integrated circuit (ASIC).

According to a further possibility, it may be provided that in accordance with step b) the vehicle influence is an influence on the transmission which is caused by the vehicle, preferably by the vehicle body, and in particular comprises or effects attenuation of a communication signal, in particular mobile radio, of the communication, in particular mobile radio, which is particularly preferably detected by a step in the temporal amplitude characteristic, in particular in the signal strength characteristic, of the evaluation signal(s). This allows safe and easy localization.

A further advantage can be achieved in the context of the invention if, in accordance with step b), the vehicle influence on the transmission is an influence which causes a change in a communication signal of the communication, in particular a change in frequency and/or a change in amplitude and/or a phase change in the communication signal, in particular received by the communication device and/or vehicle, a further advantage being achieved if, in accordance with step b), the vehicle influence of the transmission causes a change in a communication signal of the communication, in particular a frequency change and/or a change in amplitude and/or a phase change in the communication signal, a pattern which is specific for the change being preferably detected in the evaluation signal (in the evaluation). Alternatively or additionally, it is conceivable that the evaluation signal and/or the pattern can be used to detect not only the localization but also further information. This additional information is, for example, a direction of movement of the communication device and/or an activity of the operator of the vehicle carrying the communication device. This allows a comprehensive evaluation to improve the safety during operation of the vehicle.

A further advantage within the scope of the invention can be achieved if the vehicle influence is detected on the basis of an attenuation factor and/or on the basis of an attenuation duration of a reception level attenuation which is determined on the evaluation signal, whereby the communication device in particular is then located in the interior of the vehicle,

- if the attenuation period is at least 0.1 s or at least 1 s or at least 3 s or at least 5 s, and/or
- if the attenuation is at least 1 dBm or at least 5 dBm or at least 10 dBm or at least 15 dBm or at least 30 dBm or at least 50 dBm.

The attenuation duration and/or the extent of attenuation can be determined, for example, on the basis of the signal jump in the evaluation signal. The extent of attenuation is, for example, the difference of the power level (signal strength) before the jump (signal jump) and after the jump, and/or the maximum difference of the power level within a certain period of time, e.g. within the attenuation period. For the evaluation, for example, the evaluation signal can be filtered beforehand, e.g. an averaging and/or a moving average can be calculated. The attenuation duration is, for example, the duration (length) of the stage which is evaluated. The evaluation takes place, for example, using the RSSI (receive signal strength indicator). The unit "dBm", i.e. decibel milliwatt, is in particular the unit of the power level, which describes the ratio of a power to the reference power of 1 milliwatt.

Furthermore, it is conceivable that the evaluation signal is determined from the raw data of the communication device and/or from the mobile radio data of the communication device (i.e. determined by the communication device), preferably by smartphone software (App), in particular on the basis of at least one RSSI value. The communication device has, for example, a software, preferably a smartphone app, by means of which the recording of the evaluation signal and/or the transmission of the evaluation signal to the vehicle and/or the evaluation in accordance with step b) and/or a further communication device function can be carried out. The other communication device function is, for example, an ID transponder function, e.g. authentication on the vehicle. For this purpose, for example, further communication (vehicle communication), e.g. Bluetooth communication and/or radio communication, can be used with the vehicle. This greatly improves the security and convenience of authentication and localization.

It is also advantageous if the vehicle influence is detected in the evaluation signal by means of an attenuation factor, the evaluation signal preferably being specific for a signal-to-noise ratio, and the communication device preferably being located in the vehicle interior if the attenuation factor is at least 5 dB (decibel) or at least 10 dB or at least 20 dB or at least 30 dB or at least 40 dB or at least 50 dB. This makes reliable localization possible. The signal-to-noise ratio is particularly decisive for signal quality and/or reception strength in the communication device, especially in mobile radio communication. In particular, it can also be provided that the degree of attenuation can be parameterized and thus enables adaptation to different communication devices, for example. In particular, it is conceivable that the communication device, e.g. software of the communication device, carries out a parameterization of the evaluation and/or monitoring (according to step a)). Thus, the inventive method can be used with different communication devices which have different reception characteristics.

In a further possibility, it may be provided that the communication as a mobile radio communication is a communication between the communication device and a base station of the mobile radio network, the evaluation signal preferably being specific for a quality and/or a reception strength in the communication. This ensures reliable and safe localization.

Furthermore, it is conceivable within the framework of the invention that the transmission during, in particular mobile radio, communication, in particular of a communication signal, preferably mobile radio signal and/or satellite signal, is carried out in dependence on at least one transmission condition, wherein the transmission condition comprises at least one influencing factor on the propagation of radio waves, preferably mobile radio waves, in particular an electrical shielding and/or a damping by a body of the vehicle which effects a signal change, in particular signal attenuation, of the mobile radio signal which is detected on the basis of the evaluation signal. In particular, the vehicle body can be designed in such a way that a detectable vehicle influence on the transmission through the vehicle body is caused. This ensures reliable localization.

Another possibility may be for the evaluation signal to be evaluated in accordance with step b) by means of a signal curve analysis and/or pattern recognition, so that the vehicle influence is detected, preferably using statistical pattern recognition. It is also conceivable that first a partial evaluation is carried out by the communication device and then a further partial evaluation is carried out by the vehicle. This enables a meaningful and reliable evaluation according to step b).

The invention may provide that, in accordance with step b), the evaluation of the evaluation signal is carried out by the communication device, preferably by an evaluation unit of the communication device, and a result of the evaluation and/or the detection is subsequently transmitted to the vehicle via a vehicle communication, preferably a Bluetooth and/or Bluetooth low-energy communication. In particular, it is conceivable that the transmission to the vehicle could be encrypted in order to increase security during vehicle operation.

It may also be provided within the scope of the invention that, in accordance with step b), the assessment of the evaluation signal is carried out by a processing unit of the vehicle, the evaluation signal preferably being transmitted from the communication device to the processing unit via vehicle communication. This allows an increase and guarantees the reliability and speed of the evaluation.

For example, it may be provided that the monitoring of the communication according to step a), in particular mobile radio communication, is only initiated (in particular triggered) if at least one of the following (triggering) events is detected by the vehicle:
- actuation of a sensor on a seat of the vehicle, in particular the driver's seat, preferably a seat contact,
- actuation of a clutch and/or brake pedal of the vehicle,
- approach to the vehicle, in particular by a proximity sensor of the vehicle,
- carrying out an activation action on a door handle, in particular an external door handle, of the vehicle,
- actuation of a button, in particular a start/stop button and/or engine start actuating means, and/or switch and/or an input device in the interior of the vehicle, in particular for starting the engine,
- detection of a falling below a predefined distance of the communication device to the vehicle, preferably by means of a localization, preferably a GPS localization, and/or by means of a proximity sensor, in particular a capacitive proximity sensor, the GPS localization in particular being carried out by the communication device,
- evaluation of a signal from a vehicle communication, in particular a Bluetooth signal, in particular a Bluetooth low energy signal,
- the communication device receives an alarm signal, the alarm signal being emitted by the vehicle.

It is also conceivable that monitoring is only initiated if a combination and/or a certain sequence of these events is detected. This allows a safe and fast detection of the vehicle influence.

In a further possibility, it may be provided that the function of the vehicle according to step c) is only activated if a successful authentication with the communication device has taken place beforehand, whereby a security function of the vehicle, preferably a central locking system, is activated preferably as a function of the authentication. It is conceivable that the communication device may be used for authentication, whereby a code is preferably executed via a further communication (vehicle communication) of the communication device with the vehicle. In particular, it is conceivable that authentication is also initiated during the initiation of monitoring (according to step a)).

Another object of the invention is a system, in particular an authentication system, for activating at least one function of a vehicle, at least comprising:
- a mobile communication device for communication, in particular a first communication and/or mobile radio communication,
- a monitoring device (in particular for the vehicle and/or the communication device) for monitoring communication.

The monitoring device may, for example, also include separately designed electronic components, e.g. electronics of the communication device and/or the vehicle. It is in particular provided that at least one evaluation signal specific for communication can be determined by the monitoring device, and that a vehicle influence on the transmission during communication can be detected by means of an evaluation of the evaluation signal in order to carry out a localization of the communication device, in particular with respect to a vehicle interior of the vehicle, in particular different areas of the vehicle interior, so that the function of the vehicle can be activated as a function of the detection of the vehicle influence. Thus, the system in conformity with the invention has the same advantages as those described in detail with regard to a procedure in conformity with the invention. In addition, the system conforming to the invention may be capable of being operated according to a procedure conforming to the invention.

It is also advantageous if, in the context of the invention, the mobile communication device is designed for mobile radio communication via a mobile radio network via a first communication interface (of the communication device) and for vehicle communication with the vehicle via a second communication interface (of the communication device). In particular, the communication device has the first and/or second communication interface. It may also be provided that additional communication interfaces are provided for further communications (i.e. communication options), e.g. also via Bluetooth and/or WLAN. In addition, it is conceivable that in step a), in addition to mobile communication, vehicle communication can also be monitored, so that in particular a vehicle influence on vehicle communication can also be detected. This allows the localization to be further improved.

The invention may provide that the mobile communication device is designed as a mobile ID transponder and/or is designed to perform authentication on the vehicle. In particular, the mobile communication device is a mobile telephone and/or a smartphone which has such software, in particular a smartphone app, that it can perform authentication and thus functions as a mobile ID transponder. It is preferable that special software be installed on the communication device for this purpose, which is adapted to the evaluation according to step b).

Also protected is a computer program product and in particular an app (application software) for a smartphone and/or for a vehicle and/or the like. Preferably, the computer program product and/or the app is designed to at least partially perform a procedure according to the invention and/or to control a computer and/or a smartphone and/or vehicle electronics at least partially to perform the procedure according to the invention.

Optionally it is conceivable that the system comprises the vehicle, wherein the vehicle has a closed body construction and/or is designed with a completely closed rear and a fixed roof. This ensures that the vehicle influence is sufficient to serve for localization and/or detection in accordance with step b).

DESCRIPTION OF THE DRAWINGS

Further advantages, features and details of the invention result from the following description, in which examples of the execution of the invention are described in detail with reference to the drawings. The features mentioned in the claims and in the description may be essential to the invention either individually or in any combination. It is shown:

In the following figures, the identical reference signs are used for the same technical characteristics, even for different execution examples.

DESCRIPTION OF THE INVENTION

Figure 1:
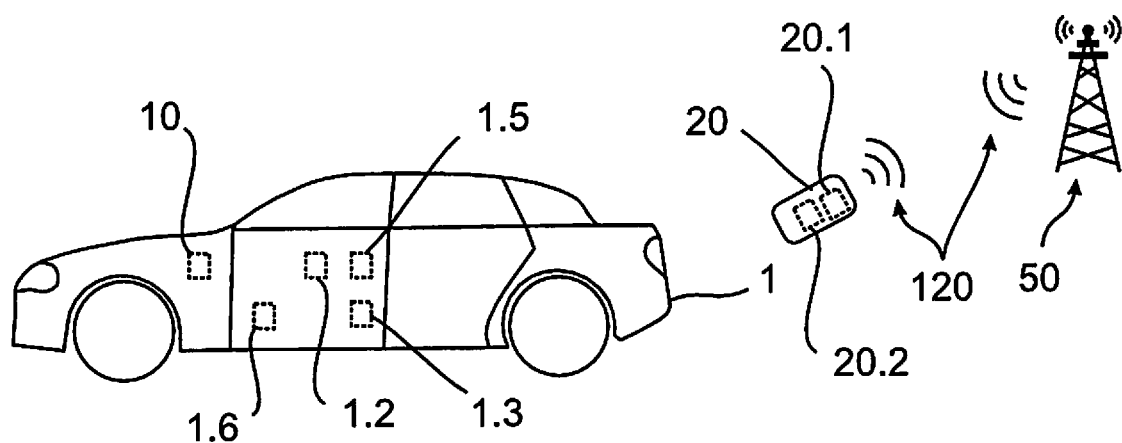
FIG. 1 schematic representation of parts of an inventive system, showing a side view of a vehicle, FIG. 2 schematic representation of parts of an inventive system, showing a plan view of a vehicle, FIG. 3 schematic representation of parts of an inventive system, FIG. 4 schematic representation of an evaluation signal, and FIG. 5 schematic representation for the visualization of a method according to the invention.
Figure 2:
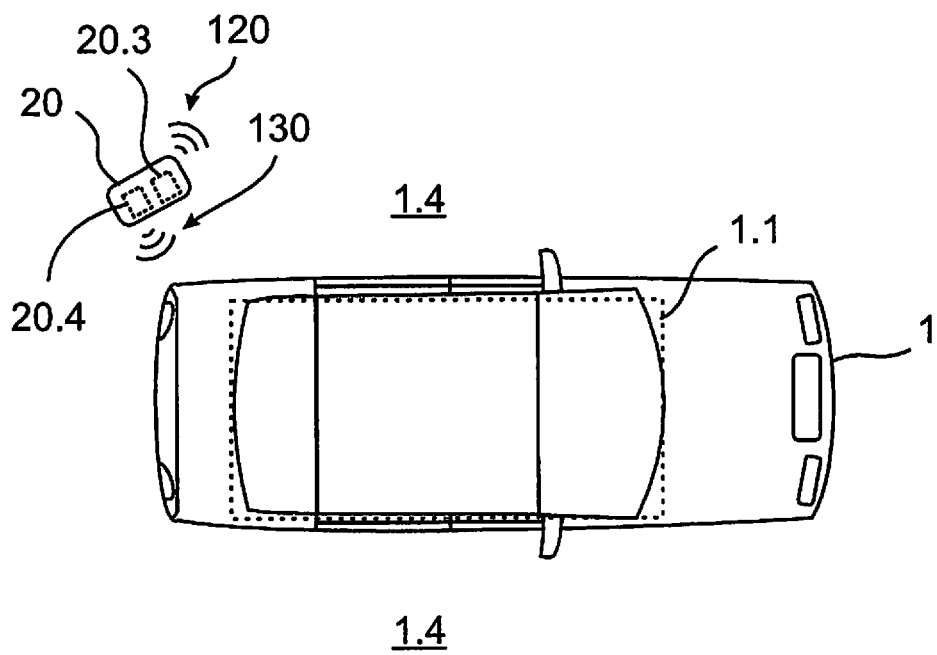

FIGS. 1 and 2 show schematic parts of an inventive system. A vehicle 1 is recognizable in a side view, whereby a locking of the vehicle 1 can be opened e.g. by the use of a communication device 20, e.g. a Smartphone 20 or an ID transponder 20. This requires authentication with the communication device 20. Alternatively, it is also conceivable that a separate ID transponder is used for authentication and the communication device 20, for example, is only used for localization.

The vehicle 1 comprises at least in part the components of the system conforming to the invention, in particular (at least in part) a monitoring device 10. The monitoring device 10 is, for example, connected to vehicle electronics and/or integrated into the vehicle electronics. For example, the vehicle electronics may comprise and/or be connected to a processing unit 1.3 and/or a data memory 1.5 and/or a communication counter interface 1.6 and/or at least one sensor 1.2. The communication counter-interface 1.6 serves, for example, for (further or second, in particular vehicle) communication 130 with the mobile communication device 20. It is conceivable here that components of the vehicle electronics of the vehicle 1 are electrically connected directly or indirectly to one another, for example in order to ensure data exchange (e.g. between the sensor 1.2 and the monitoring device 10).

It may also be provided that the communication device 20 has electronics, preferably an evaluation unit 20.1 and/or a data storage unit 20.2. As shown in FIG. 2, optionally a first communication interface 20.3 and/or a second communication interface 20.4 of the communication device 20 may also be provided.

The processing unit 1.3 of the vehicle 1 and/or the evaluation unit 20.1 of the communication device 20 are preferably used for evaluating data and/or for evaluating the evaluation signal 110 in accordance with step b) of the method according to the invention 100. For this purpose, the evaluation unit 20.1 and/or the processing unit 1.3 comprise, for example, electronic components, in particular a microprocessor and/or a digital signal processor and/or a flash memory and/or an integrated circuit, preferably an application-specific integrated circuit (ASIC). It may be provided that the evaluation signal 110 in accordance with step b) is evaluated at least partially by the communication device 20 itself and then at least one (partial) result of this evaluation is transmitted to the vehicle 1. Alternatively or additionally it is conceivable that the evaluation signal 110 is transmitted from the communication device 20 to vehicle 1. In order to enable this transmission, it may be provided that a (further or second) communication 130 is provided between the communication device 20 and the vehicle 1. For example, the communication counter interface 1.6 of the vehicle 1 and the second communication interface 20.4 of the communication device 20 serve this purpose. This (second or further) communication 130 is, for example, a vehicle communication 130 and/or a Bluetooth communication 130 and/or a mobile radio communication 130 and/or an NFC communication 130 and/or a WLAN communication 130. It is also conceivable that an authentication of the communication device 20 takes place on the vehicle 1 via this (further) communication 130.

It may be provided that a (e.g. first) communication 120, in particular a mobile radio communication 120, of the communication device 20 is monitored in accordance with step a) of the method 100 according to the invention. In addition to the first communication 120, a further communication 130, e.g. a vehicle communication 130 between the communication device 20 and vehicle 1, can also be provided. Further communications, e.g. 120, 130 (i.e. further communication possibilities), with or without the involvement of vehicle 1, may also be provided. Preferably the first communication 120 or all (in particular first or also further) communications 120, 130 of the communication device 20 take place between the communication device 20 and a base station 50 in a mobile radio network without participation of the vehicle 1.

Figure 3:
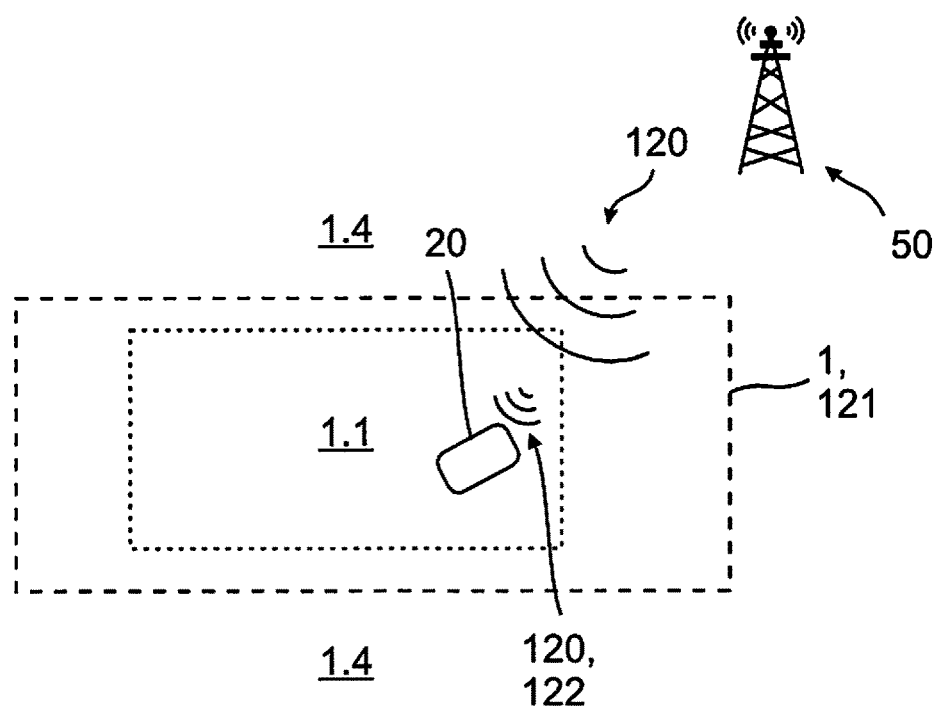

Communication 120 is exemplified by mobile communication 120 in FIGS. 1 and 2. For this purpose, the communication device 20 uses, for example, a first communication interface 20.3 to transmit a radio signal to a base station 50 of a mobile radio network. The transmission is carried out, for example, by electromagnetic waves, so that the electromagnetic waves or the radio signal are influenced by environmental influences (ambient conditions). In generally speaking, communication 120 involves the transmission of at least one communication signal, whereby the transmission depends on influences on the communication signal, e.g. ambient conditions and/or the transmission medium. Since the transmission, in particular the signal path, can also be influenced by vehicle 1, in particular by a vehicle body, we can address here the vehicle influence 121 (on the transmission). For example, it is conceivable that the communication signal of communication 120 may be reduced if the communication device 20 is located inside vehicle 1 in a vehicle interior 1.1. In this case, for example, the communication signal of communication 120 must first penetrate the transmission through the vehicle body of vehicle 1 in order to reach vehicle exterior 1.4 and base station 50. On the other hand, if the communication device 20 is located outside vehicle 1 in the vehicle exterior space 1.4, the transmission is not affected or only slightly affected by the vehicle influence 121. In addition, it is also conceivable that different vehicle influences 121 are planned and/or can be detected, e.g. as a result of the communication device 20 being in different areas of the vehicle interior 1.1. The vehicle body of vehicle 1 and/or an active vehicle influence 121 of vehicle 1, for example, causes a reception level attenuation 122, which is shown schematically in FIG. 3.

Figure 4:
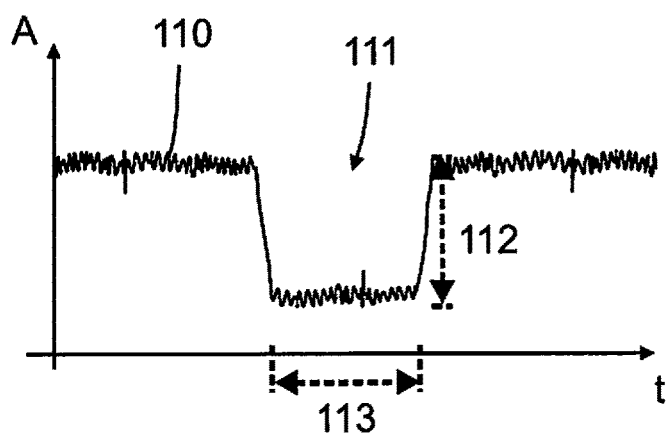

The evaluation according to a method 100 in accordance with the invention is shown in FIG. 4 by means of an evaluation signal 110. The evaluation signal 110 comprises, for example, information on a signal strength, in particular on the basis of a signal amplitude A A. Preferably, a temporal course of the evaluation signal 110 is evaluated, e.g. by means of a time series analysis. This means that the evaluation signal 110 in particular can also be a time series signal. FIG. 4 shows the progression over time t. It can be seen that a signal jump 111 occurs at the beginning of an attenuation period 113. This is caused, for example, by an operator of vehicle 1 entering the vehicle interior 1.1 with the communication device 20 and/or all doors of vehicle 1 being closed. This has a significant effect on the transmission in communication 120 through the vehicle influence 121. In addition to a signal jump 111, for example, a pattern 111 can also be evaluated to detect the vehicle influence 121. In particular, the attenuation period 113 is also evaluated, so that it must exceed a threshold value, for example, so that the vehicle influence 121 is positively determined and/or it is determined that the communication device 120 is located in the vehicle interior 1.1. Furthermore, it may be provided that an attenuation factor 112 is also taken into account in the evaluation, so that, for example, minor signal jumps 111 do not lead to the detection of the vehicle influence 121.

Figure 5:
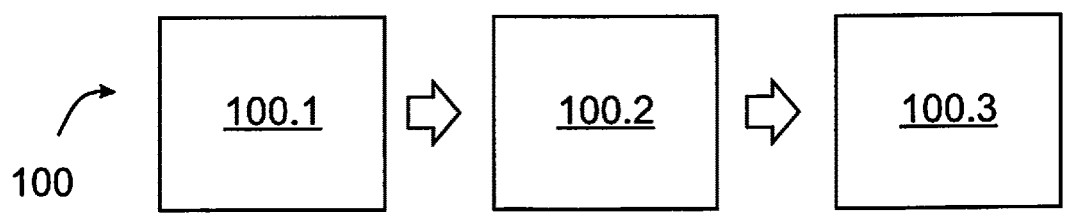

FIG. 5 shows a schematic visualization of an invention-based procedure 100. In accordance with a first method step 100.1, the communication 120, in particular a mobile radio communication 120 and/or a vehicle communication 130, is monitored, at least one evaluation signal 110, in particular a communication signal 110, specific to the communication 120 being determined. According to a second step 100.2, the detection of a vehicle influence 121 on a transmission during communication 120 is carried out by means of an evaluation of the evaluation signal 110 in order to localize the communication device 20. According to a third method step 100.3, the function of vehicle 1 is activated, in particular only if the vehicle influence 121 (positive) is detected. A GPS signal, for example, can also be evaluated for detection. In addition, it may be possible for an RSSI to be measured during communication 120 in order to detect the vehicle influence 121. In particular, the vehicle shall change the magnitude or amplitude of a communication signal of communication 120 so that such change indicates the origin of the communication device 20.

The preceding explanation of the embodiments describes the present invention exclusively in the context of examples. Of course, individual features of the embodiments can be freely combined with each other, if technically reasonable, without leaving the scope of the present invention.

REFERENCE NUMBERS

1 Vehicle
1.1 Vehicle interior
1.2 Sensor
1.3 Processing unit
1.4 Vehicle exterior
1.5 Data memory
1.6 Communication counter interface
10 Monitoring device
20 Communication device
20.1 Evaluation unit
20.2 Data storage unit
20.3 First communication interface
20.4 Second communication interface
50 Base station
Method
100.1 First method step
100.2 Second method step
100.3 Third method step
110 Evaluation signal
111 Signal step, pattern
112 Amount of attenuation
113 Attenuation period
120 Communication, mobile radio communication, vehicle communication
121 Vehicle influence
122 Reception level attenuation
130 Vehicle communication, further communication
t time
A amplitude

The invention claimed is:

1. Method for activating at least one function of a vehicle, by a mobile communication device being provided for communication, consisting of the following steps:
    a) monitoring the communication, wherein at least one evaluation signal specific for the communication is determined,
    b) detecting a vehicle influence on a transmission during communication using an evaluation of the at least one evaluation signal in order to perform a localization of the mobile communication device,
    c) activating the function of the vehicle depending on the detection of the vehicle influence wherein the mobile communication device carries out the communication as a vehicle communication with the vehicle; and wherein a signal jump of the at least one evaluation signal is detected during the evaluation in accordance with step b) for detection of the vehicle influence, wherein a further communication via a further communication technology is carried out by the mobile communication device whereby the at least one evaluation signal or a result of the evaluation is transmitted via the further communication,
wherein the vehicle influence is detected with at least the aid of an attenuation factor or with the aid of an attenuation duration of a reception level attenuation which is determined with the aid of at the at least one evaluation signal,
wherein the communication device is localized inside the vehicle,
    if at least the attenuation device is at least 5 s, or
    if the attenuation factor is at least 15 dBm.

2. The method according to claim 1, wherein the mobile communication device performs the communication as a mobile radio communication via a mobile radio network.

3. The method according to claim 1, wherein in addition to the communication as primary communication according to step a) in a further communication, the monitoring is performed so that the at least one evaluation signal for the further communication is specific if the monitoring of the primary communication according to step a) is unsuccessful.

4. The method according to claim 1, wherein the communication device is recognized by GPS.

5. The method according to claim 1, wherein the detection of the vehicle influence in accordance with step b) is used to determine if the communication device is located in the vehicle interior, with the function of the vehicle then being activated in accordance with step c).

6. The method according to claim 1, wherein when the at least one evaluation signal is evaluated in accordance with step b), an extent of the vehicle influence on the communication is determined, and the localization of the communication device according to step b) wherein the communication device in the vehicle interior is located when at least the extent or the at least one evaluation signal for the location in the vehicle interior is specific.

7. The method according to claim 1, wherein the monitoring of the communication is triggered by the vehicle.

8. The method according to claim 1, wherein the detected vehicle influence is specific for an interference influence on the communication, which is caused by the bodywork of the vehicle.

9. The method according to claim 2, wherein the at least one evaluation signal is determined as a function of a mobile radio signal of the mobile radio communication.

10. The method according to claim 1, wherein a time characteristic of the at least one evaluation signal is evaluated in accordance with step b).

11. The method according to claim 1, wherein in accordance with step b), a signal jump is detected in a time profile of the at least one evaluation signal which is specific for introducing the communication device from the outside of the vehicle into the vehicle interior.

12. The method according to claim 1, wherein in accordance with step b), the vehicle influence on the transmission is an influence which is caused by the vehicle and causes a damping of a communication signal of the communication.

13. The method according to claim 1, wherein in accordance with step b), the vehicle influence on the transmission is an influence which causes a change in a communication signal of the communication received by at least the communication device or vehicle.

14. The method according to claim 1, wherein
the attenuation duration is at least 0.1 s or
the attenuation factor is at least 50 dBm.

15. The method according to claim 1, wherein the at least one evaluation signal is determined from the raw data of at least the communication device or from the mobile radio data of the communication device.

16. The method according to claim 1, wherein the vehicle influence is detected in the at least one evaluation signal by means of an attenuation factor.

17. The method according to claim 1, wherein in that the communication as a mobile radio communication is a communication between the communication device and a base station of the mobile radio network.

18. A system for activating at least one objective of a vehicle, comprising:
a mobile communication device for communication,
a monitoring device for monitoring the communication, wherein
at least one evaluation signal specific for the communication can be determined by the monitoring device, and a vehicle influence of the vehicle on a transmission during the communication can be detected by means of an evaluation of the at least one evaluation signal in order to carry out a localization of the communication device, so that the objective of the vehicle can be activated as a response to the detection of the vehicle influence, wherein a further communication via a further communication technology is carried out by the mobile communication device whereby the at least one evaluation signal or a result of the evaluation is transmitted via the further communication,
wherein the vehicle influence is detected with at least the aid of an attenuation factor or with the aid of an attenuation duration of a reception level attenuation which is determined with the aid of the at least one evaluation signal,
wherein the communication device is localized inside the vehicle,
if at least the attenuation duration is at least 5 s, or
if the attenuation factor is at least 15 dBm.

* * * * *